(12) United States Patent
Carrier et al.

(10) Patent No.: US 8,275,648 B2
(45) Date of Patent: Sep. 25, 2012

(54) SYSTEM AND METHOD FOR MANAGING A SURVEY FOR A COMMUNITY DEVELOPMENT ASSET

(75) Inventors: Scott R. Carrier, Apex, NC (US); Helena S. Chapman, Wellesley, MA (US); John R. Hind, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1373 days.

(21) Appl. No.: 11/876,331

(22) Filed: Oct. 22, 2007

(65) Prior Publication Data

US 2009/0106080 A1 Apr. 23, 2009

(51) Int. Cl.
G06Q 10/00 (2012.01)
G06Q 30/00 (2012.01)
(52) U.S. Cl. ...................................... 705/7.32
(58) Field of Classification Search ............... 705/10, 705/1.1, 7.27
See application file for complete search history.

(56) References Cited

U.S. PATENT DOCUMENTS

| | | | | |
|---|---|---|---|---|
| 7,197,470 | B1* | 3/2007 | Arnett et al. | 705/7.29 |
| 7,280,977 | B2* | 10/2007 | Sengir et al. | 705/7.27 |
| 7,624,081 | B2* | 11/2009 | Zhao et al. | 706/20 |
| 2005/0038533 | A1* | 2/2005 | Farrell et al. | 700/73 |
| 2005/0080655 | A1* | 4/2005 | Sengir et al. | 705/8 |
| 2007/0061219 | A1* | 3/2007 | Palestrant et al. | 705/26 |
| 2007/0204308 | A1* | 8/2007 | Nicholas et al. | 725/86 |
| 2007/0260599 | A1* | 11/2007 | McGuire et al. | 707/5 |
| 2008/0104172 | A1* | 5/2008 | Craig | 709/204 |
| 2008/0235375 | A1* | 9/2008 | Reynolds et al. | 709/225 |
| 2008/0243586 | A1* | 10/2008 | Dohring et al. | 705/10 |
| 2008/0270615 | A1* | 10/2008 | Centola et al. | 709/228 |

OTHER PUBLICATIONS

G. David Carson, Sampling, available at http://www2.chass.ncsu.edu/garson/pa765/sampling.htm, last visited Oct. 5, 2007, pp. 1-12.
Andrew Gelman et al., Not Asked and Not Answered: Multiple Imputation for Multiple Surveys, Oct. 22, 1997, pp. 1-35, available at http://polmeth.wustl.edu/retrieve.php?id=388.
Andrew Gelman, Struggles With Survey Weighting an Regression Modeling, Jun. 22, 2005, pp. 1-17, available at http:polmeth.wustl.edu/retrieve.php?id=565.
Portal: The Guide to Computing Literature, Automating Survey Coding by Multiclass Text Categoriztaion Techniques, Abstract, pp. 1-4, available at http://portal.acm.org/citation.cfm? id=965969, last visited Oct. 5, 2007.
Wikipedia, Folksonomy, pp. 1-3, available at http://en.wikipedia.org/wiki/Folksonomy, last visited Oct. 5, 2007.

* cited by examiner

*Primary Examiner* — Seye Iwarere
(74) *Attorney, Agent, or Firm* — Jeffrey T. Holman

(57) ABSTRACT

A system and method to manage a survey for a community development asset. The system includes a response repository, a sampler, a respondent profile filter, and an inference generator. The response repository stores a plurality of survey responses from survey respondents about a community development asset. The sampler selects a sample response of the plurality of survey responses. The sample response corresponds to an identified respondent. The respondent profile filter identifies a community with which the identified respondent is associated. The inference generator infers a similar response from the community associated with the identified respondent based on the sample response of the identified respondent.

19 Claims, 7 Drawing Sheets

SYSTEM AND METHOD FOR MANAGING A SURVEY FOR A COMMUNITY DEVELOPMENT ASSET

BACKGROUND OF THE INVENTION

It is not unusual for distributed teams to work together virtually in a team space. Typical collaborative activities involve the development of a software asset, as well as consumption of the asset in a way that is cost effective. There are many social networking software programs and other tools that allow an asset provider and asset consumers to connect or collaborate through computer technology. Often, conventional collaboration takes place in more than one team area of the same project corresponding to the asset that is produced. For example, a project may use team room, a wiki, and a blog (or some other collaboration space) to reach out to the appropriate user community. Information about a software asset can be duplicated in all these places, and users may need to monitor all applicable communication channels to ensure the integrity of information published. The benefits of social networking tools sometimes also bring the challenges for users to identify which team areas are indeed worth close monitoring and which team areas only warrant casual engagement.

A social networking service is often a web based internet/intranet collaboration/information sharing service. The shared information is often accessible to the public. Additionally, other people with similar interests can view the information by category or tags of a folksonomy. Most conventional social networking services have algorithms to implement the concept of inference from the tag by examining the clustering of particular tags and, hence, finding relationship between one another. An important element in most of these services is the concept of a person's community, which means providing a way to rank query results based on the person's social network, which includes direct associates and more distant associates separated by degrees. Most of these conventional social networking services provide aggregate news feeds of places, filtered by tags, that a person's social network finds interesting. Many conventional social networking services also provide ways to attach comments and/or ratings to items indexed by the tags. It should be noted that the tags themselves also have a community, which includes the collection of people who use a tag to describe an object. Similarly, the objects also have a community, which includes the people who tag a particular object.

Given the successes of the open source software (OSS) approach to software development, many firms have started to implement the best practices of OSS to traditional closed-source development. An open collaborative development approach enables a single firm to leverage skills of all of its employees to benefit the entire organization, or at least a relatively large portion of the organization. With an open collaborative environment for development teams, harvesting software assets for reuse (e.g., in derivative applications) is facilitated and often encouraged. However, the ability to reuse a software asset can be complicated by a users' inability to make a meaningful decision whether a software asset is appropriate to reuse. While feedback or input from fellow consumers may be solicited by the developers of the software asset, the usefulness of the feedback received can be questionable because of the limited response. Hence, the feedback does not necessarily provide an indication of consumer priorities for updates to the software asset.

Also, in a community based development environment, one of the biggest challenges is the ability for the consumers of a software asset to be able to provide useful feedback to the provider of that asset. Sharing useful feedback among peers within the community based development environment is also a challenge. Rather than receive critical feedback during the development cycle of the software asset, it is typical to receive feedback from consuming users after the software is substantially or fully developed.

For example, a consumer may determine that the software does not meet the consumer's expectations. Additionally, the discovery of a deficiency in the operability of the software asset may occur late in the development cycle. Alternatively, a deficiency may be discovered after a significant amount of time and money is invested to integrate the software asset into other applications.

The asset provider, on the other hand, often requests comprehensive feedback to be submitted early and often so appropriate resources can be allocated to work on issues that might arise. However, most software development projects do not receive substantial input in a timely manner to gauge changes that may be incorporated into the software asset. To facilitate this kind of feedback and asset development, interaction of the various parties within the community related to the software asset is encouraged. One type of useful interaction is the use of surveys to request and provide feedback about a particular software asset. In order for the survey to be meaningful, the survey responses should include enough survey samples to harvest useful information. Unfortunately, many surveys do not produce substantial results because of the lack of enough survey responses or difficulty in evaluating the quality of the survey responses.

SUMMARY OF THE INVENTION

Embodiments of a system are described. In one embodiment, the system is a system to manage a survey for a community development asset. Other embodiments may facilitate survey management for other types of surveys. In one embodiment, the system includes a response repository, a sampler, a respondent profile filter, and an inference generator. The response repository stores a plurality of survey responses from survey respondents about a community development asset. The sampler selects a sample response of the plurality of survey responses. The sample response corresponds to an identified respondent. The respondent profile filter identifies a community with which the identified respondent is associated. The inference generator infers a similar response from the community associated with the identified respondent based on the sample response of the identified respondent. Other embodiments of the system are also described.

Embodiments of an apparatus are also described. In one embodiment, the apparatus is a computer program product including a computer useable storage medium to store a computer readable program that, when executed on a computer, causes the computer to perform operations to evaluate feedback for a survey about a community development asset. In an embodiment, the operations include an operation to receive a plurality of survey responses from survey respondents about the community development asset. The operations also include an operation to select a sample response of the plurality of survey responses. The sample response corresponds to an identified respondent. The operations also include an operation to identify a community with which the identified respondent is associated. The operations also include an operation to infer a similar response from the community associated with the identified respondent based on the sample response of the identified respondent. Other embodiments of the apparatus are also described.

Embodiments of a method are also described. In one embodiment, the method is a method for managing survey responses. In an embodiment, the method includes receiving a plurality of survey responses from survey respondents and selecting a sample response of the plurality of survey responses. The sample response corresponds to an identified respondent. The method also includes identifying a community associated with the identified respondent and inferring a similar response from the community of the identified respondent based on the sample response of the identified respondent. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE SEVERAL VIEWS OF THE DRAWINGS

Throughout the description, similar reference numbers may be used to identify similar elements.

DETAILED DESCRIPTION OF THE INVENTION

Figure 1:
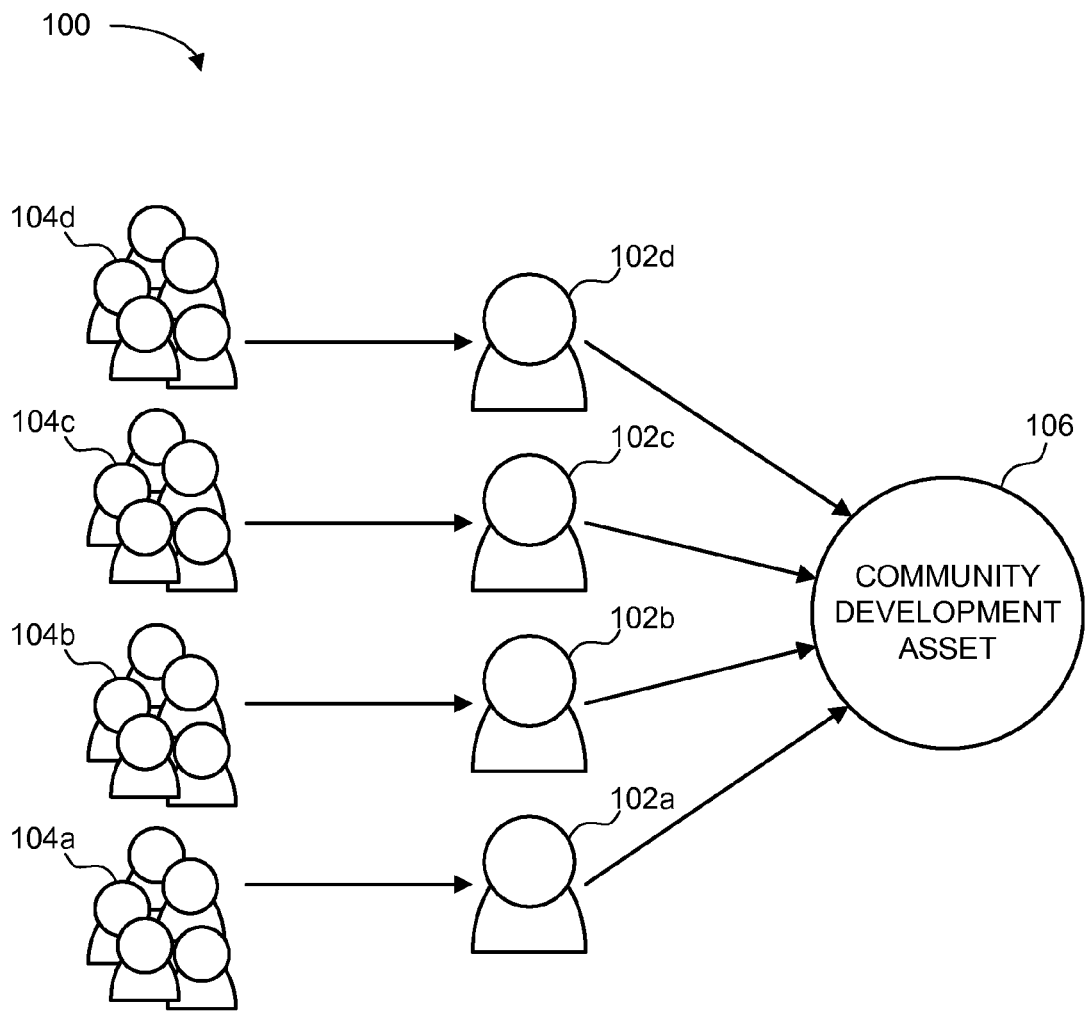
FIG. 1 depicts a schematic diagram of one embodiment of a community development network.

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

While many embodiments are described herein, at least some of the described embodiments facilitate management of survey feedback using a closed-loop feedback system for community based open collaborative teams to use without expert knowledge of market intelligence methodologies. Such embodiments enable community based development teams to receive constructive input and advocate the values of their assets.

The number of response provided for a particular survey is often small, and the responses are sometimes incomplete. In order to use the feedback provided via the survey, additional information may be gleaned from the survey responses. Along with attribute numeric ratings of a software asset (e.g. capability, usability, performance, reliability, maintainability, documentation, serviceability, etc.), verbatim comment analysis provides additional insights to the overall impression of the asset. Where the number of completed surveys is otherwise small, and possibly insufficient, to interpret the feedback alone, a deterministic system to apply some kind of weighting mechanism can help interpret the input based on limited feedback. This may be useful if the weighting applied is representative of a perspective of a community of users.

As one way of implementing the embodiments described herein, people with similar interests and social associations may be assumed to have similar perspectives on particular issue. Therefore, feedback for a given set of people may be used as a representation of the overall population's opinion or perspective. In some embodiments, social networking communities are used to identify a community with similar interests and social associations. While social networking communities may be defined in many ways, some exemplary social networking communities encompass people who communicate with each other on a regular basis, as well as people who use similar modes of communication as information sources (e.g., email, instant messaging (IM), wikis, web logs (blogs), forums, shared bookmarks, etc). For a community development project, the concept extends to people who regularly interact with the community development asset such as contributors, downloaders, and people that report problems and/or ask for features. One observation is that a community boundary is not an absolute concept and can account for familiarity, in addition to direct associations, including "friends of friends" with the impact trailing off as the strength of connection or "bond" decreases. A related statistic is the degree of overlap between two communities accounting for the bond strength of the respective members.

Furthermore, some embodiments provide a simple and easy to use survey system in which the asset owner can effectively receive useful feedback from the relevant community. In addition, the asset owner also has a way to reach out to other potential users who are evaluating whether to adopt the asset based on the input of fellow users. In embodiments of the system, in addition to the numeric ratings collected through a survey process, a set of descriptive terms used by a user is interpreted for other meanings based on information mined from various social network communities in which the user participates. Other embodiments are also described below with specific reference to the corresponding figures.

FIG. 1 depicts a schematic diagram of one embodiment of a community development network 100. In particular, the community development network 100 includes users 102a-d, and the users' associated communities 104a-d, that are associated with a community development asset 106. The community development asset 106 may be a software asset that is produced and/or consumed within the community development network 100. The users 102 may include asset owners such as developers and quality assurance and technical support users. The users 102 also may include direct and indirect consumers.

Each user 102 has an associated community 104. The community 104 associated with a particular user 102 may be defined by the social network of the user 102, the involvement of the user 102 in one or more projects, and/or the placement of the user 102 within an organizational hierarchy of some kind. Additionally, it should be noted that the communities 104 associated with several users 102 may at least partially overlap, within the context of the community development asset 106 and the community development network 100.

Figure 2:
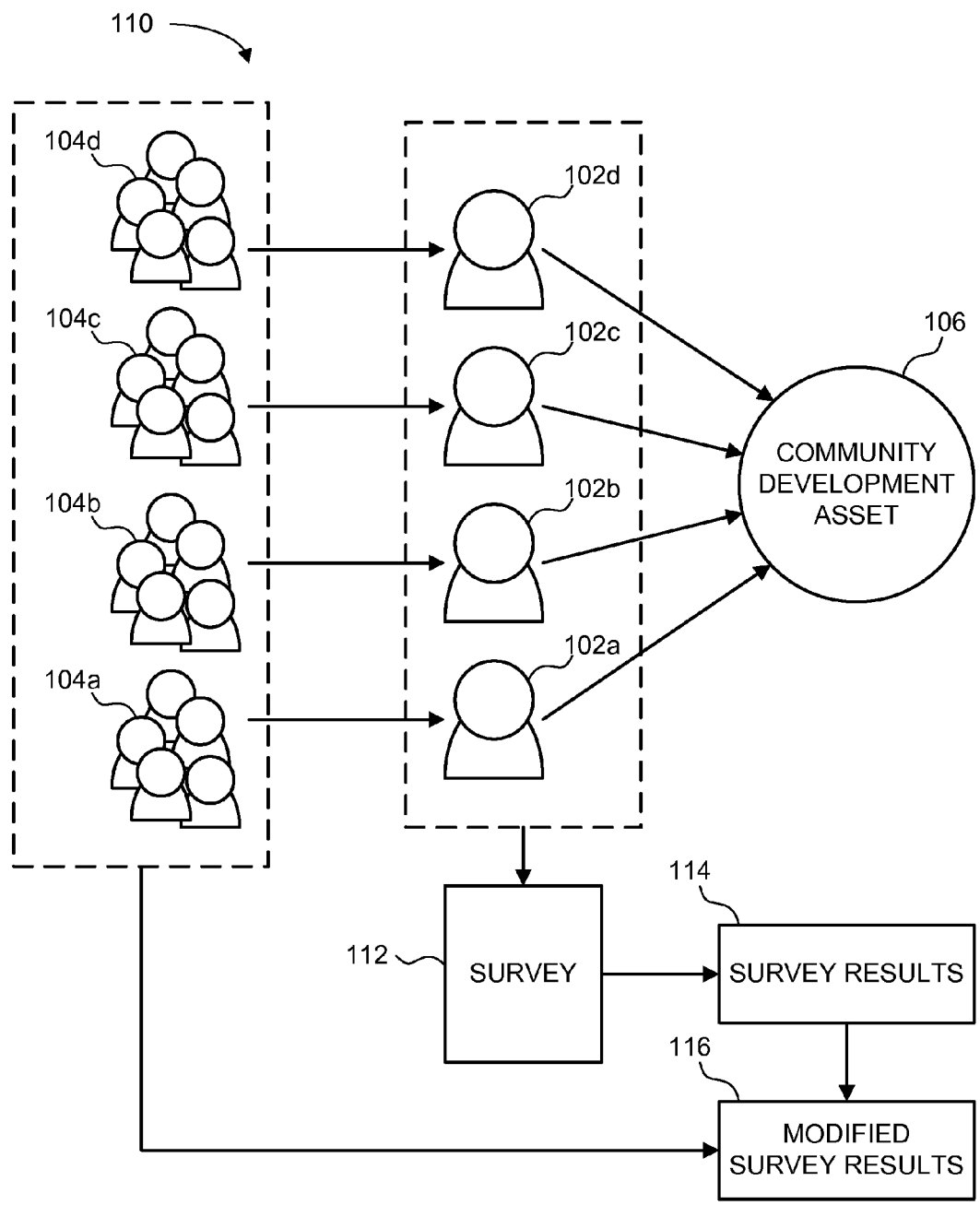
FIG. 2 depicts a schematic process flow diagram of one embodiment of a method for evaluating survey feedback.

FIG. 2 depicts a schematic process flow diagram 110 of one embodiment of a method for evaluating survey feedback. The illustrated process flow diagram 110 includes the community development network 100 of FIG. 1, including the users 102 and related communities 104 associated with the community development asset 106.

In one embodiment, the users 102 are invited to participate in a survey 112 about the community development asset 106. Alternatively, a subset of the users 102 and/or other individuals may be invited to participate in the survey 112. The participation of at least some of the users 102 in the survey 112 provides survey results 114. Often the survey results 114 represent the participation of a very small subset of the invited users 102. Additionally, the survey results 114 may represent the partial responses of users 102 who did not complete the entire survey 112 due to lack of time or other reasons.

In the illustrated process flow diagram 110, the survey results 114 are used in conjunction with knowledge of the communities 104 associated with each of the users 102 to generate modified survey results 116. In one embodiment, the modified survey results 116 are based on the actual survey results 114 provided by the users 102, as well as one or more inferred responses from the associated communities 104. The inferred responses from the communities 104 are based, at least in part, on the association between each community 104 and the corresponding user 102.

Additionally, the inferred responses may be weighted based on the strength of the association between the communities 104 and the corresponding users 102, as described in more detail below. So an embodiment of the illustrated process flow diagram 110 effectively draws representative input from the given feedback based on the community association of the responding user 102. Hence, the process flow diagram 110 illustrates systematically applying a weighting mechanism to the feedback provided by the users 102 based on social network data to describe the community association of the users 102. If a user 102 has a strong association with a community 104 of people within a community development network 100, then the similar responses are inferred for the community 104 under the assumption that the community 104 shares similar opinions about attributes of a given software asset.

In one example, person A and person B are active users of shared asset X. Although person A and person B are both asked to provide feedback on shared asset X, person A provides feedback but person B does not provide feedback. Using social network data that indicates a community association between person A and person B, it is inferred that the opinion of person B is represented by the opinion of person A. Therefore, the responses and comments from person A are considered to be input from both person A and person B. Thus, the modified survey results 116 are an augmented version of the actual survey results 114 to reflect the inferred feedback of person B in addition to the actual feedback of person A. A similar inference can be drawn even if person B was not initially invited to provide feedback about the shared asset X.

In another example, person A and person C both have experiences adopting asset Y. Although both person A and person C are asked to provide feedback about the shared asset Y, only person A responds. Using social network data that indicates a community association between person A and person C, the feedback from person A can be reflected as feedback from both person A and person C. Thus, the modified survey results 116 are an augmented version of the actual survey results 114 to reflect the inferred feedback of person C in addition to the actual feedback of person A.

Figure 3:
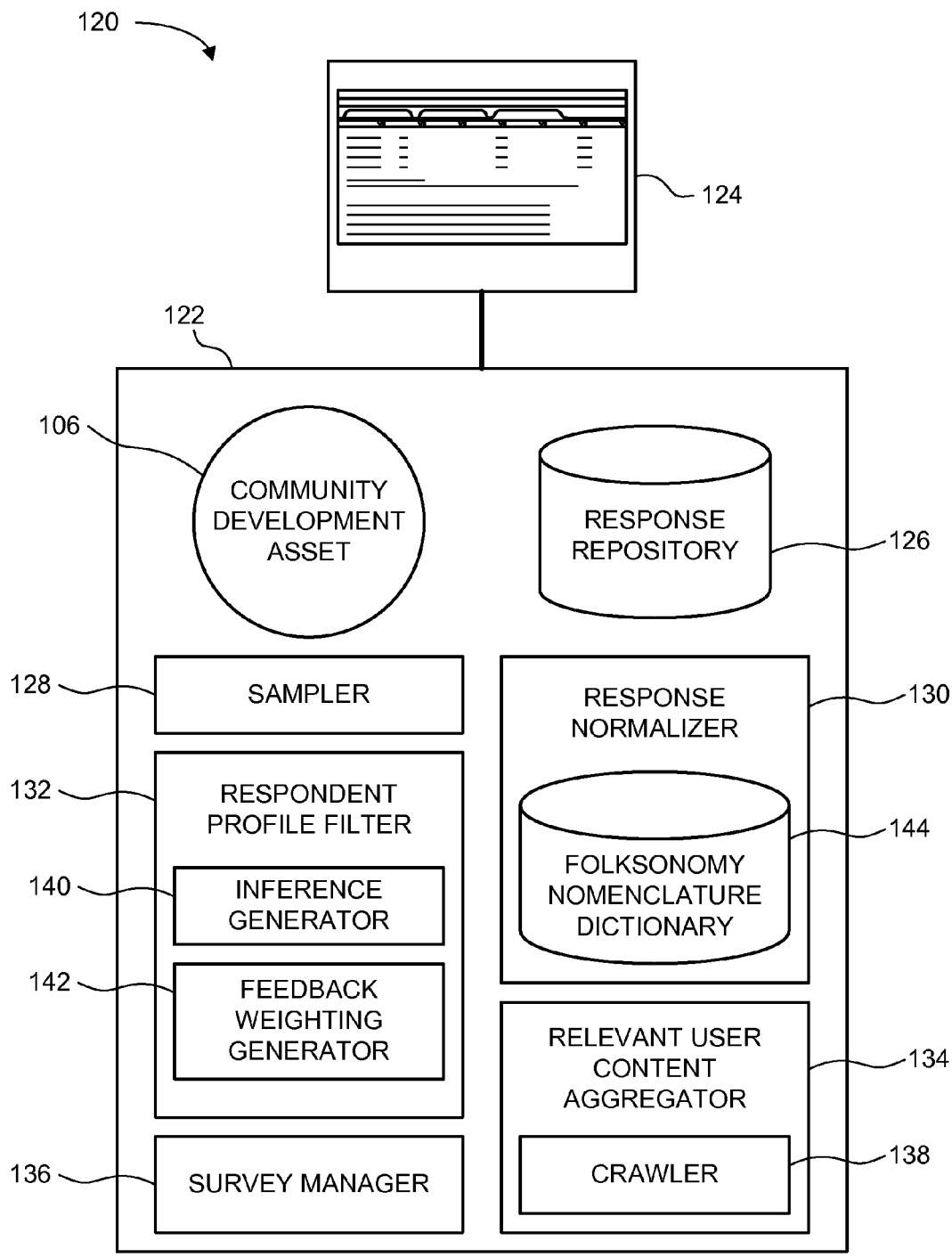
FIG. 3 depicts a schematic block diagram of one embodiment of a survey management system for managing survey feedback.

FIG. 3 depicts a schematic block diagram of one embodiment of a survey management system 120 for managing survey feedback. Although certain components of the survey management system 120 are shown and described herein, other embodiments may implement fewer or more components and provide more or less functionality than the survey management system 120 shown in FIG. 3.

The illustrated survey management system 120 includes a collaborative development network device 122 and a display device 124 coupled to the collaborative development network device 122. The illustrated collaborative development network device 122 includes the community development asset 106 and a response repository 126. The illustrated collaborative development network device 122 also includes a sampler 128, a response normalizer 130, a respondent profile filter 132, a relevant user content aggregator (RUCA) 134, and a survey manager 136. The RUCA 134 includes a crawler 138. The respondent profile filter 132 includes an inference generator 140 and a feedback weighting system 142. Additionally, the response normalizer 130 includes a folksonomy nomenclature dictionary 144.

In general, the response repository 126 stores a plurality of survey responses from survey respondents, or users 102, about the community development asset 106. In one embodiment, the response repository 126 includes a response database. In some embodiments, the response repository 126 may be distributed over multiple computing devices.

Figure 6:
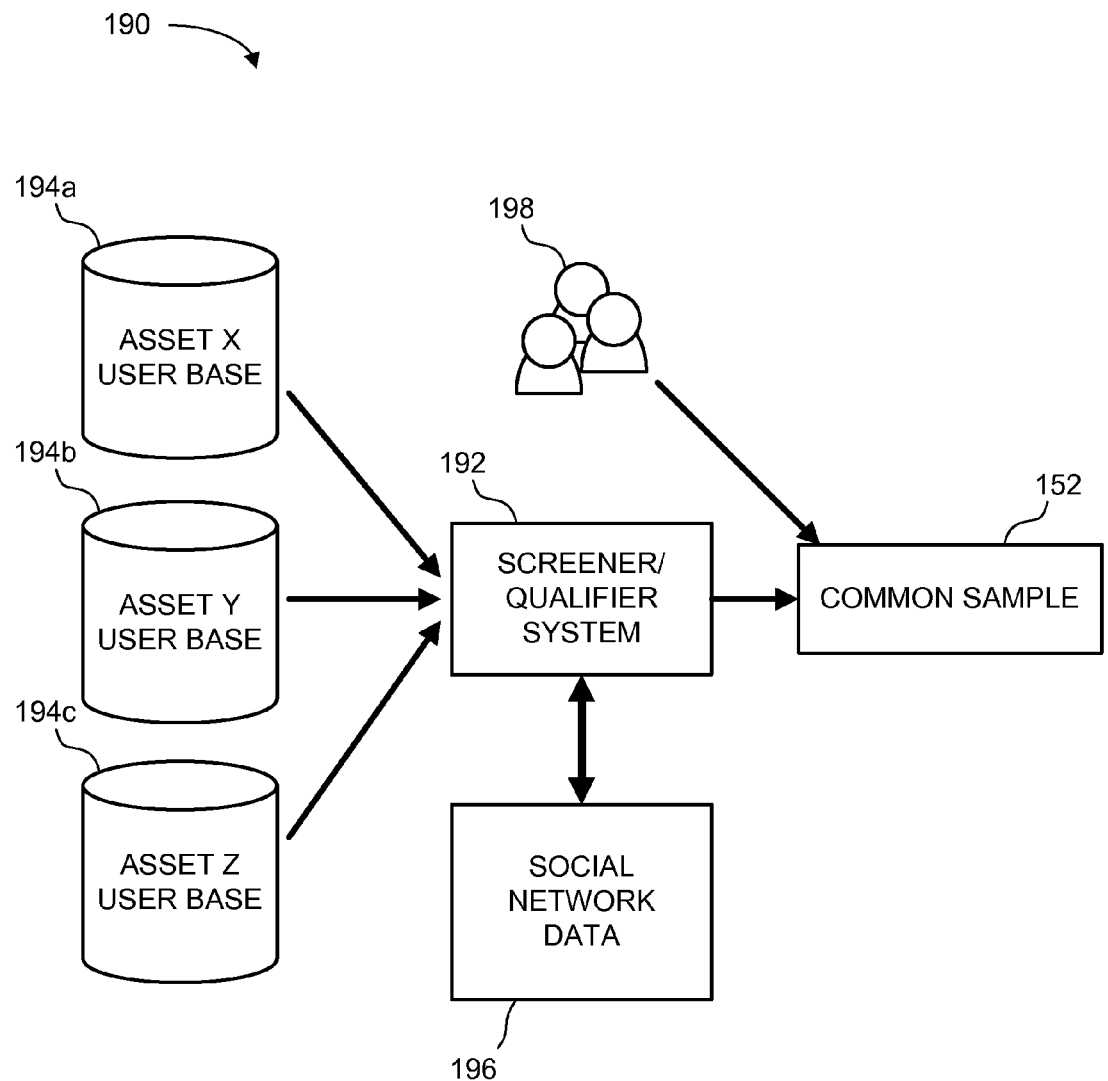
FIG. 6 depicts a schematic process flow diagram of one embodiment of the sampler of FIG. 3.

In one embodiment, the sampler 128 selects a sample response of the plurality of survey responses. The sample response corresponds to an identified respondent 102. Additional functionality of the sampler 128 is shown in FIG. 6 and described in more detail below.

In one embodiment, the response normalizer 130 is invoked to draw a correlation between actual feedback from the users 102 and normalized survey responses. In order to normalize the survey feedback, the response normalizer 130 may reference the folksonomy nomenclature dictionary 144. In one embodiment, the folksonomy nomenclature dictionary 144 stores a plurality of normalized responses. The response normalizer 130 normalizes a sample response according to at least one of the plurality of normalized responses of the folksonomy nomenclature dictionary 144. In this way, the response normalizer 130 facilitates more accurate assessment of the survey results 114, including any verbatim comments provided with the survey feedback.

In other words, once survey results 114 are obtained from survey 112, the response normalizer 130 normalizes the comments to ensure that the information reflected in the survey results 114 is understandable. As an example, assume person A has opinions about software assets X and Y based on the experiences of person A. Person B also has experience adopting software asset X. Accordingly, person A and person B are both invited to provide feedback regarding software asset X. Although both persons A and B provide feedback about the software asset X, the feedback may be different to some degree. Even though the feedback might be different, past survey data and/or social network information associated with these individuals may be used to infer that the comments provided by person A and the comments provided by person B are directed to the same aspect of the software asset X. For example, a comment about "usability" from person A and a comment about "ease of use" from person B are both related to usability of the software asset X. Similarly, a comment about "integration" from person A and a comment about "compatibility" from person B may be correlated with each other regarding the interoperability of the software asset X. Likewise, a comment about "responsiveness of problem resolution" from person A and a comment about "better technical support" from person B both relate to serviceability for the software asset X.

In one embodiment, the respondent profile filter 130 identifies a community 104 with which the identified respondent 102 is associated. The community 104 and respondent 102 are both registered users of the community development network 100. The respondent profile filter 130 uses social networking data to gather information on the background, interests, and involvement of the respondent 102 with a community based asset 106 to ensure a higher likelihood of receiving useful information about the asset 106.

The illustrated respondent profile filter 130 also includes the inference generator 140 and the feedback weighting system 142. In one embodiment, the inference generator 140 infers a similar response from the community 104 associated with the identified respondent 102 based on the sample response of the identified respondent 102. In one embodiment, the feedback weighting system 142 assigns a weighting factor to the inferred response based on a strength of association between the identified respondent 102 and the identified community 104 associated with the identified respondent 102. The weighting of the input for a particular respondent 102 can be applied by taking into consideration the entire associated community 104 for that user 102.

In some embodiments, weighting is applied in a manner that corresponds to the strength of a relationship between a user 102 and an associated community 104. The strength of the relationship may correlate to the degrees of separation between the user 102 and peers within the community 104. It should also be noted that, in some embodiments, the weighting of an inferred opinion of the community 104 associated with a user 102 may be superseded by the actual opinions of the community 104, if the actual opinions of the community 104 are determined to be relevant to the survey 112 and the community development asset 106. As explained in more detail below, the RUCA 134 may determine if discovered content of the community 104 associated with a user 102 is relevant to the survey 112 and the community development asset 106.

In one embodiment, the RUCA 134 aggregates user content related to the users 102 who provided the survey results 112. In other words, the RUCA 134 finds user content that is related to the opinions of the users 102 and stores the discovered user content, for example, in the response repository 126. Alternatively, the RUCA 134 stores the discovered user content in another data repository. In one embodiment, the RUCA 134 invokes the crawler 138 to mine a plurality of information sources associated with the identified respondent 102 to identify user content of the identified respondent 102 that is related to the sample response. This discovered content may be used to further qualify the feedback provided by the user 102. Additionally, this discovered content may be used to infer the response of the community 104 associated with the user 102.

In one embodiment, the crawler 138 searches through the social network of the user 102 to gauge information around the feedback provided by the user 102. For example, if the respondent 102 suggests that the "performance" of an asset is inadequate, then the crawler 138 may use feedback to research the tag "performance" in social bookmarks, wiki, blogs, or other reference sources of the respondent 102. Moreover, the crawler 138 may interface with dynamic content, for example, by subscribing to a blog (e.g., subscribing to the comment feed or subscribing to a feed for the tags used in a posting), in addition to simply accessing an existing blog posting.

Additionally, by finding other people who also use similar tags and keywords, the RUCA 134 may assist the respondent profile filter 132 in identifying the network of people associated with the user 102. Hence, the identified network of people, or community 104, may be considered as also reflecting the feedback provided by the respondent 102.

As an example of the functionality of the RUCA 134, a person may provide feedback that states "Product XYZ is bad," and the RUCA 134 may find a blog posting titled "Why Product XYZ is bad." Given the similarity of the language of the comment to the language of the blog posting, there is a possibility that this blog posting is relevant to the information sought by way of the survey 112. Furthermore, the blog posting may constitute the direct opinion of the user 102 targeted for the survey 112. Additionally, like-minded people within that community 104 associated with that user 102 might also post information relevant to what the product team is trying to ascertain via the survey 112. For instance, a colleague of the targeted user 102 may be an avid blogger and may write clearly and post all kinds of opinions about the product in question. In fact, the colleague's opinions may even influence the opinions of the targeted user 102. Since this information retrieved by the RUCA 134 may be applicable to the information being queried in the survey 112, the colleague's opinions may be given appropriate weight within the social network topology of the targeted user 102.

In addition to the targeted users 102 determined from a user base and/or user profiles, feedback may be provided by random users who happen to learn about the community development asset 106 through actual usage or word of mouth. In one embodiment, the RUCA 134 also expands on the feedback provided such respondents to provide additional views of the community development asset 106 based on the backgrounds of the random users. For example, if person D is not a member of the original invited respondent sample pool, but nevertheless completes a survey 112 for asset X, the feedback from person D may be considered as input and the RUCA 134 may attempt to discover related content associated with person D. In one embodiment, the crawler 138 mines for additional information about person D (as well as the invited respondents 102, as described above) related to the verbatim comments provided by person D.

In one embodiment, the display device 124 is configured to display at least some of the identified user content. The display device 124 also may display one or more hyper-links to an original source of at least a portion of the identified user content. In this way, when the asset owner is interested in learning more about the comments, the asset owner can follow the embedded links to the comments and find additional information.

In one embodiment, the survey manager 136 dynamically modifies a pool of survey questions in response to an analysis of the plurality of survey responses from the survey respondents 102. In other words, the survey manager 136 may alter which questions are included in the survey 112 based on the survey results 114 provided by the users 102. In another embodiment, the survey manager 136 dynamically designates a pool of target survey respondents 102 to include a new target survey respondent from the community 104 associated with the identified respondent 102. In other words, the survey manager 136 can dynamically change who is invited to directly respond to the survey 112, for example, based on the survey results 114 achieved and/or the types of content discovered by the RUCA 134.

Figure 4:
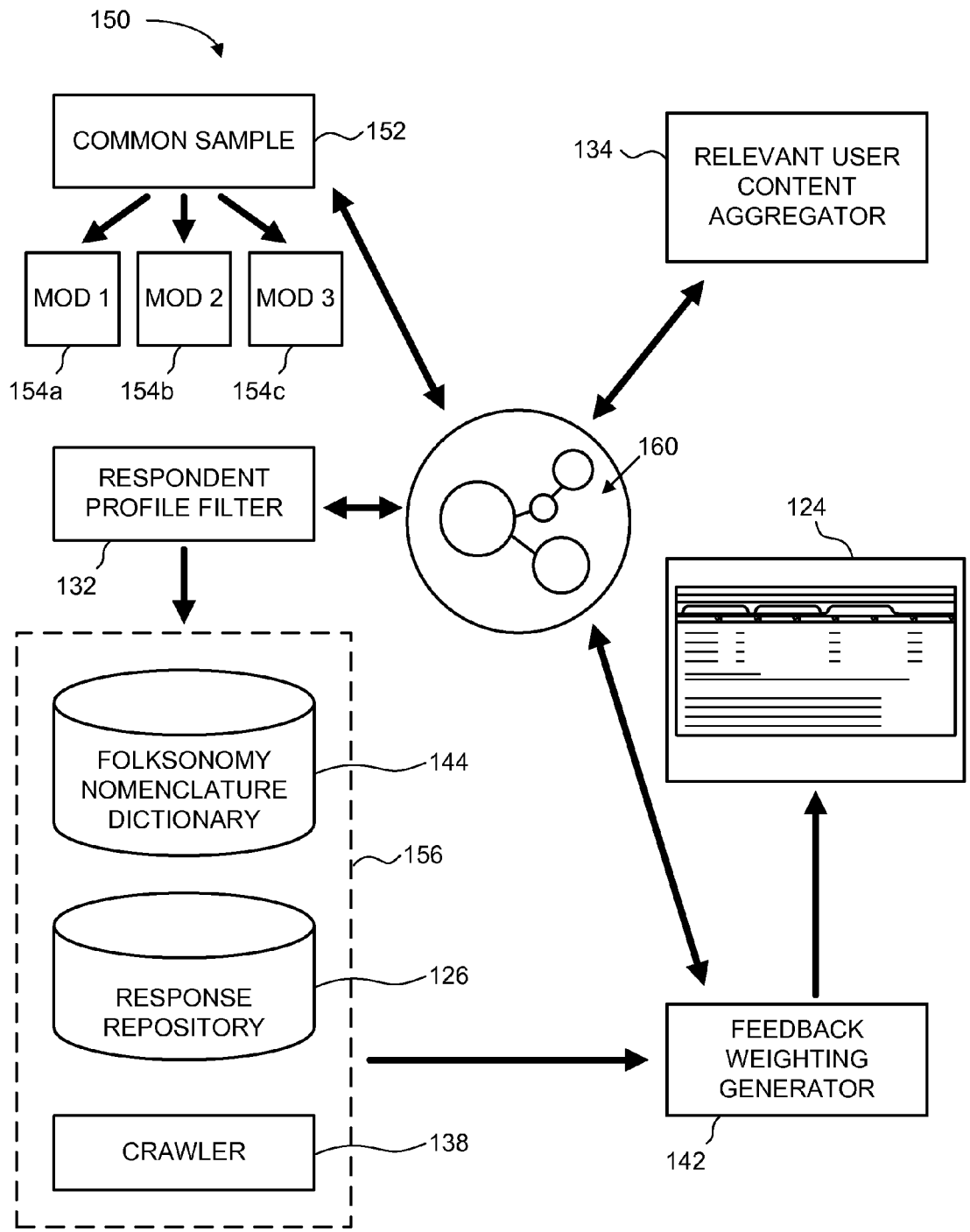
FIG. 4 depicts a schematic process flow diagram of one embodiment of the survey management system of FIG. 3.

FIG. 4 depicts a schematic process flow diagram 150 of one embodiment of the survey management system 120 of FIG. 3. The illustrated process flow diagram 150 depicts interactions among various components of the survey management system 120. In one embodiment, the sampler 128 identifies a common sample 152, which is made up of targeted users 102, as well as random respondents. In one embodiment, the survey samples are selected based on user profiles with data mined (e.g., mined by the crawler 138) from the user's network 160. The modules 154a-c are various survey modules in the entire survey to a particular respondent 102. In some embodiments, different modules are provided to different respondent based on the background of each respondent. In some embodiments, a respondent's answer to a question may affect which survey module 154a-c gets launched for the remainder of the survey process. For example, if a survey respondent has background in databases, in addition to a core set of common modules (e.g., modules 154a and 154b), the respondent may also be asked to provide input on a module (e.g., module 154c) only related to database capabilities.

Once the survey results 114 are obtained, the respondent profile filter 132 analyzes the social network 160 of the users 102 to find out which communities 104 are associated with each user 102.

Also, the response normalizer 130 normalizes the feedback data to create consistent results and to recommend actions from descriptions retrieved from the folksonomy nomenclature dictionary 144. Additionally, the RUCA 134 invokes the crawler 138 (e.g., a data crawler service) to gather user content from reference sources related to the users 102. In one embodiment, the RUCA 134 stores the identified user content in the response repository 126.

Based on the profiles of the respondents 102, the feedback weighting system 142 applies weighting factors to infer the possible feedback for surveys 112 that are incomplete or which result in an insufficient sample size, according to typical statistical analysis. In one embodiment, the identified content is displayed on the display device 124 for visual inspection by the asset owner or another user. The asset owner may be able to select specific user content and to access the original user content by following an embedded link shown on the display device 124. Other embodiments may implement other processes and/or operations.

It should also be noted that there are existing methods in analyzing a series of independent cross-sectional surveys in which some questions are not answered in some surveys and some respondents do not answer all of the questions posed. In-depth studies have been performed on this topic and are known in the art.

Additionally, one common problem in taking a very small number of samples of a large population is that the distribution of un-weighted samples regularly and systematically deviates from the population distribution from official statistics. To compensate for this phenomenon, additional questions are often added to the interview to classify each sample with regard to the sample's relation to known statistics. This classification is then used to weigh the answers to the base questions appropriately, as is known in the art.

Figure 5:
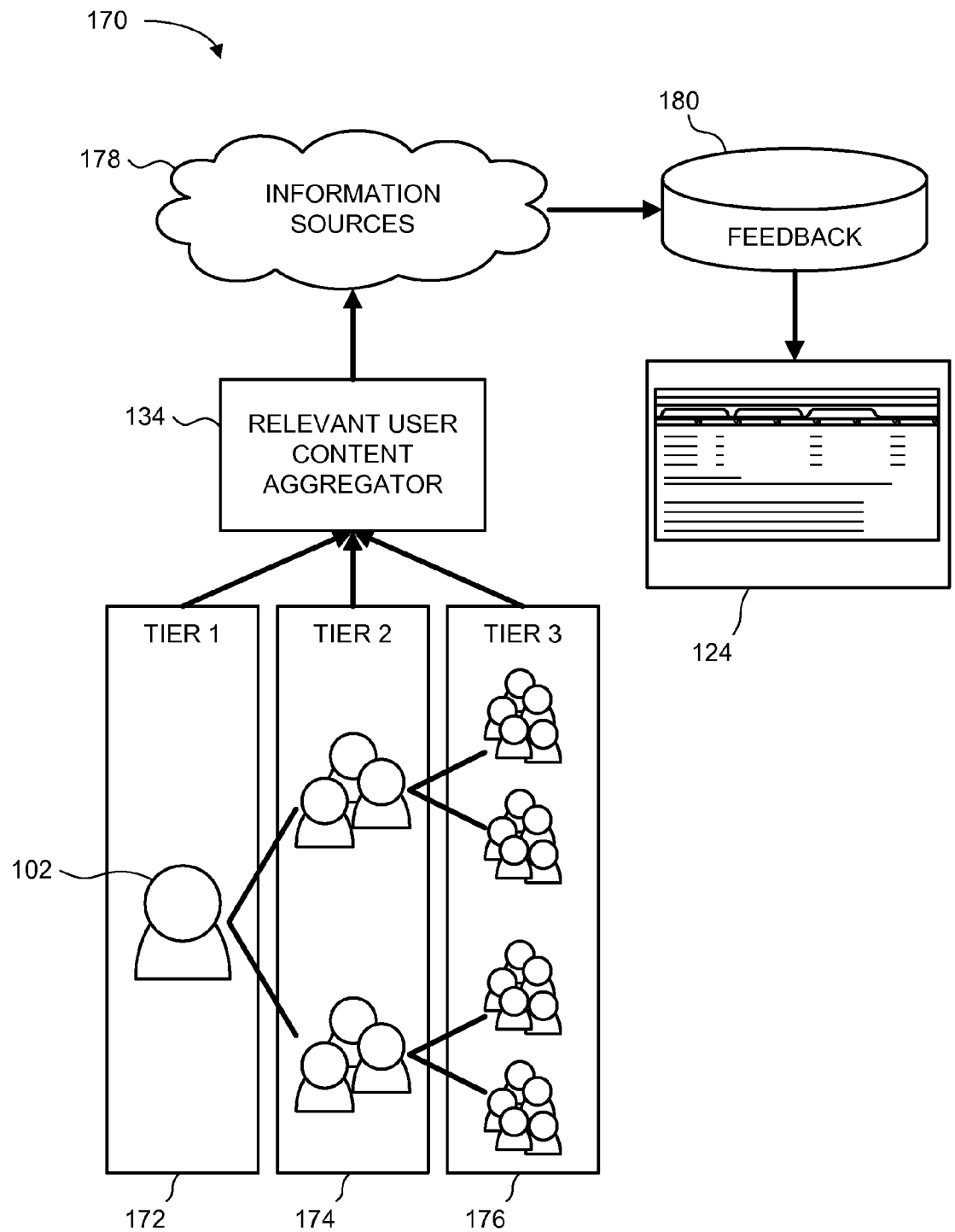
FIG. 5 depicts a schematic process flow diagram of one embodiment of the relevant user content aggregator of FIG. 3.

FIG. 5 depicts a schematic process flow diagram 170 of one embodiment of the RUCA 134 of FIG. 3. The illustrated process flow diagram 170 depicts interactions of the RUCA 134. In one embodiment, the RUCA 134 automatically aggregates user-generated content deemed relevant to the queries of the survey 112. The RUCA 134 then weighs that data according to degrees of separation in a social network (e.g., Tier 2 174 and Tier 3 176) of the respondent 102 (e.g., Tier 1 172). As mentioned above, the RUCA 134 may use the crawler 138 to detect and subscribe to Atom/RSS feeds of relevant information sources 178 and content streams, in addition to caching the existing data. In one embodiment, the RUCA 134 caches the identified user content in a feedback database 180 such as the response repository 126 or another repository. By caching the identified user content, and possibly subscribing to dynamic content sources, the RUCA 134 enables asset owners to view the user contents on the display device 124 and to analyze and explore the survey results 114 in order to infer additional meaning beyond simply the verbatim survey feedback. Additionally, the asset owner may explore the opinions of other people within the community 104 associated with each user 102. Other embodiments may implement other processes and/or operations.

It should also be noted that natural language analysis may be used to get a better understanding of the verbatim comments in the survey feedback. In some embodiments, the natural language analysis is part of the data analysis stage. In addition to post survey data cleaning and calculating the numeric ratings of input, basic coding algorithms may facilitate consideration of the community 104 associated with the respondent 102. Studies on such coding are known in the art.

Additionally, the mining process implemented by the crawler 138 may produce a dictionary of conceptual objects mapped to terms that correlate to certain communities 104, as expressed by a corresponding set of statistics from these classifications. In some embodiments, the related social network information of the respondents 102 may be used to define community boundaries. For example, the network of people who use a particular tag to describe an asset may be defined by the use of a common tag. Additionally, within the scope of community based development environments, the usage information may be researched to also find out more about the network of people that potentially may be targeted for the survey 112. In one embodiment, the RUCA 134 analyzes an individual's social network topology, as well as profile information on the individual and the corresponding social network profile, to implement a fishnet-like approach to gather user generated content (e.g. blog posting, wiki, bookmarks, etc.) relevant to the data points queried in the survey 112.

As explained above, the mined data may be used in several ways. In one embodiment, the mined data is used as a source of information which allows active solicitation of feedback from individuals most likely to provide quality feedback, rather than simply requesting feedback from all related parties. In another embodiment, the mined data is used as a base of information that enhances textual analysis of comments. In another embodiment, the mined data is used as a substitute for survey questions designed to classify a sample with respect to population statistics. As a result, a simpler interview process may be used to achieve a higher likelihood of user response. In another embodiment, the mined data is used as a source of statistics which allow weighting of the survey responses to produce much higher quality results. In other embodiments, the mined data may be used to enrich the survey comments in additional ways. Hence, the RUCA 134 provides an intelligent survey system in which some questions can be dynamically formed to obtain more elaborate responses based on existing views expressed in the user generated content of a social network.

FIG. 6 depicts a schematic process flow diagram 190 of one embodiment of the sampler 128 of FIG. 3. In one embodiment, the screener/qualifier system 192 periodically goes through the asset user bases 194a-c and associated social network data 196 so there is some common understanding of respondents' background in the sample pool. Each asset user base 194a-c may correspond to a particular community development asset 106. In addition, the screener/qualifier system 192 may have the flexibility to skip some survey questions based on the information obtained from the asset user bases 194a-c and the social network data 196. For example, if the screener/qualifier system 192 identifies the sample response selected by the sampler 128 to have significant development contribution to the corresponding community development asset 106, then the respondent's level of knowledge of the asset 106 can then be derived and associated questions regarding the respondent's user experiences with that asset can be skipped. Additionally, the common sample 152 may include responses from one or more random users 198.

It should also be noted that the data sample may be cleansed prior to a survey process. Some exemplary types of cleansing conform to the recommendations for "Availability Sampling" and "Expert Sampling" (i.e., "Judgment Sampling"), as are known in the art.

The ability to draw comprehensive conclusions based on a limited set of information relies on efficient acquisition of a sample pool, after the data cleansing process. Efficient acquisition of the sample pool is more likely to provide the asset owner with useful information based on both the social network data as well as past survey results.

Additionally, as explained above, questions can be dynamically formed to obtain more elaborate responses based on existing views expressed in blogs, wikis, forums, and other user content reference sources. Furthermore, survey questions in which answers have already been or can be gleaned from the social network may be omitted to avoid redundancy and shorten the length of time required to fill out the survey. In this way, the response rate increases.

Figure 7:
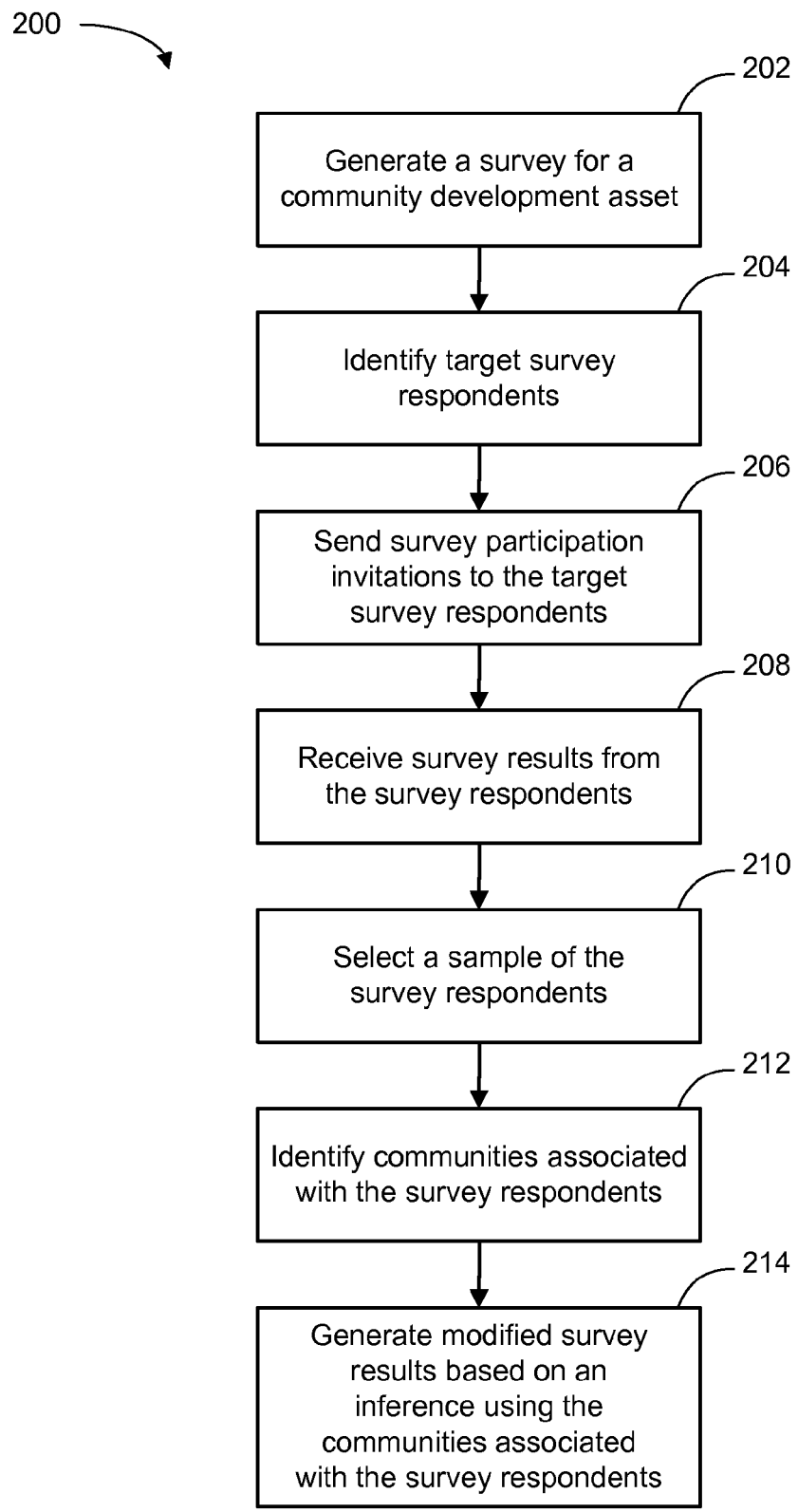
FIG. 7 depicts a schematic flow chart diagram of one embodiment of a survey management method for managing survey feedback.

FIG. 7 depicts a schematic flow chart diagram of one embodiment of a survey management method 200 for managing survey feedback. For ease of explanation, the survey management method 200 is described with reference to the survey management system 120 of FIG. 3. However, some embodiments of the survey management method 200 may be implemented with other survey management systems. In general, the survey management method 200 includes receiving a plurality of survey responses from survey respondents, selecting a sample response of the plurality of survey responses, identifying a community associated with the identified respondent, and inferring a similar response from the community of the identified respondent based on the sample response of the identified respondent.

In a more detailed embodiment illustrated in FIG. 7, the survey manager 136 generates 202 a survey 112 for a community development asset 106. The sampler 128 identifies 204 target survey respondents and sends 206 survey participation invitations to the target survey respondents. The survey manager 136 then receives 208 the survey results 114 and stores the survey results 114 in the response repository 126. The sampler 128 then selects 210 a sample of the survey respondents, and the respondent profile filter 132 identifies 212 one or more communities 104 associated with the selected survey respondents 102. The respondent profile filter 132 then generates 214 modified survey results 116 based on in inference using the communities 104 associated with the selected survey respondents 102. The depicted survey management method 200 then ends.

From the foregoing description, it can be understood that embodiments described herein can implement many functions within the survey management system 120. Some embodiments implement a sample collection system which dynamically locates desired samples for surveys based on social network data. For example, the system may use social networking data to profile respondent samples to ensure higher likelihood of receiving comprehensive input by analyzing blog, wiki content, or other community content sources among those who already have experience adopting the asset. Another embodiment provides a normalization process that automatically normalizes the verbatim input based on social network data by inferring meaning from folksonomy dictionary mined from the respondent's blog, wiki, shared bookmarks, and other community content sources. Another embodiment facilitates a methodology which infers opinions for a community of developers based on input from a respondent by applying a weighting mechanism to optimize confidence interval in survey results based on the social network standing of the respondent in relationship to his/her community. This methodology also provides a way to drill down and explore relevant user generated content from an individual's social network. Another embodiment implements a system to weight a sample input based on statistics derived from social networking with respect to the community population to produce a simpler interview process. Another embodiment provides an intelligent survey system in which some questions can be dynamically formed to invoke more elaborate responses based on existing views expressed in the user generated content of a social network.

It should also be noted that at least some of the operations for the survey management system 120 and/or the survey management method 200 may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to receive a plurality of survey responses from survey respondents about the community development asset and an operation to select a sample response of the plurality of survey responses. The sample response corresponds to an identified respondent. The operations also include an operation to identify a community with which the identified respondent is associated and an operation to infer a similar response from the community associated with the identified respondent based on the sample response of the identified respondent.

Further embodiments of the computer program product include an operation to assign a weighting factor to the inferred response based on a strength of association between the identified respondent and the identified community with which the respondent is associated. Another embodiment includes an operation to assign a weighting factor to the inferred response based on a size of the identified community with which the respondent is associated. Another embodiment includes an operation to assign a first weighting factor to a first associated peer within the identified community of the identified respondent and an operation to assign a second weighting factor to a second associated peer within the identified community associated with the identified respondent. In this embodiment, the first associated peer is closer than the second associate peer to the identified respondent in degrees of separation and, hence, the first weighting factor is greater than the second weighting factor.

Another embodiment includes an operation to normalize the sample response according to a folksonomy nomenclature dictionary. The folksonomy nomenclature dictionary includes a plurality of normalized responses. Another embodiment includes an operation to crawl a plurality of information sources associated with the identified respondent to identify user content of the identified respondent that is related to the sample response and an operation to aggregate the identified user content in a response repository. Exemplary information sources include a weblog, a wiki, a forum, an email, a chat history, a bookmark, or a web feed. Another embodiment includes an operation to display at least some of the identified user content on a display device to a user. Another embodiment includes an operation to display a hyper-link to an original source of at least a portion of the user content displayed on the display device.

Another embodiment includes an operation to dynamically generate a new survey question in response to a variation in the plurality of survey responses to a more general original question of the survey. Another embodiment includes an operation to dynamically remove an existing survey question from the survey in response to a determination that the existing survey question provides substantially redundant feedback compared to survey responses of another existing survey question. Another embodiment includes an operation to invite an associated peer within the identified community associated with the identified respondent to participate directly in the survey. Other embodiments of the computer program product may include operations to implement additional functionality, as described herein.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable storage medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product comprising a computer useable storage medium to store a computer readable program that, when executed on a computer, causes the computer to perform operations to evaluate feedback for a survey about a community development asset, the operations comprising:
    receive a plurality of survey responses from survey respondents about the community development asset;
    select a sample response of the plurality of survey responses, wherein the sample response corresponds to an identified respondent;
    identify a community with which the identified respondent is associated, wherein the community comprises a social network;
    infer a similar response from the community associated with the identified respondent based on the sample response of the identified respondent;
    assign a first weighting factor to a first associated peer within the identified community of the identified respondent; and
    assign a second weighting factor to a second associated peer within the identified community associated with the identified respondent, wherein the first associated peer is closer than the second associated peer to the identified respondent in degrees of separation, and wherein the first weighting factor is greater than the second weighting factor.

2. The computer program product of claim 1, wherein the computer readable program, when executed on the computer, causes the computer to perform an operation to assign a weighting factor to the inferred response based on a strength of association between the identified respondent and the identified community with which the respondent is associated.

3. The computer program product of claim 1, wherein the computer readable program, when executed on the computer, causes the computer to perform an operation to assign a weighting factor to the inferred response based on a size of the identified community with which the respondent is associated.

4. The computer program product of claim 1, wherein the computer readable program, when executed on the computer, causes the computer to perform an operation to normalize the sample response according to a folksonomy nomenclature dictionary, wherein the folksonomy nomenclature dictionary comprises a plurality of normalized responses.

5. The computer program product of claim 1, wherein the computer readable program, when executed on the computer, causes the computer to perform:
    an operation to crawl a plurality of information sources associated with the identified respondent to identify user content of the identified respondent that is related to the sample response; and
    an operation to aggregate the identified user content in a response repository.

6. The computer program product of claim 5, wherein the plurality of information sources comprises at least one of a weblog, a wiki, a forum, an email, a chat history, a bookmark, or a web feed.

7. The computer program product of claim 5, wherein the computer readable program, when executed on the computer, causes the computer to perform an operation to display at least some of the identified user content on a display device to a user.

8. The computer program product of claim 7, wherein the computer readable program, when executed on the computer, causes the computer to perform an operation to display a hyper-link to an original source of at least a portion of the user content displayed on the display device.

9. The computer program product of claim 1, wherein the computer readable program, when executed on the computer, causes the computer to perform an operation to dynamically generate a new survey question in response to a variation in the plurality of survey responses to a more general original question of the survey.

10. The computer program product of claim 1, wherein the computer readable program, when executed on the computer, causes the computer to perform an operation to dynamically skip a particular survey question in the survey in response to a determination that feedback from the particular survey question provides redundant input based on information derived from mining social network data and respondent profiling.

11. The computer program product of claim 1, wherein the computer readable program, when executed on the computer, causes the computer to perform an operation to invite an associated peer within the identified community associated with the identified respondent to participate directly in the survey.

12. A system, comprising:
  a response repository comprising a storage device to store a plurality of survey responses from survey respondents about a community development asset;
  a sampler coupled to the response repository, the sampler to select a sample response of the plurality of survey responses, wherein the sample response corresponds to an identified respondent;
  a respondent profile filter coupled to the sampler, the respondent profile filter to identify a community with which the identified respondent is associated, wherein the community comprises a social network;
  an inference generator coupled to the respondent profile filter, the inference generator to infer a similar response from the community associated with the identified respondent based on the sample response of the identified respondent; and
  a feedback weighting system coupled to the inference generator, the feedback weighting system to:
    assign a first weighting factor to a first associated peer within the identified community of the identified respondent; and
    assign a second weighting factor to a second associated peer within the identified community associated with the identified respondent, wherein the first associated peer is closer than the second associated peer to the identified respondent in degrees of separation, and wherein the first weighting factor is greater than the second weighting factor.

13. The system of claim 12, the feedback weighting system further to assign a weighting factor to the inferred response based on a strength of association between the identified respondent and the identified community associated with the identified respondent.

14. The system of claim 12, further comprising:
  a folksonomy nomenclature dictionary coupled to the sampler, the folksonomy nomenclature dictionary to store a plurality of normalized responses; and
  a response normalizer coupled to the folksonomy nomenclature dictionary, the response normalizer to normalize the sample response according to at least one of the plurality of normalized responses of the folksonomy nomenclature dictionary.

15. The system of claim 12, further comprising:
  a crawler coupled to the response repository, the crawler to mine a plurality of information sources associated with the identified respondent to identify user content of the identified respondent that is related to the sample response; and
  a relevant user content aggregator coupled to the crawler, the relevant user content aggregator to aggregate the identified user content in the response repository.

16. The system of claim 15, further comprising a display coupled to the response repository, the display to display at least some of the identified user content, wherein the display is further configured to display a hyper-link to an original source of at least a portion of the identified user content.

17. The system of claim 12, further comprising a survey manager coupled to the response repository, the survey manager to dynamically modify a pool of survey questions in response to an analysis of the plurality of survey responses from the survey respondents.

18. The system of claim 12, further comprising a survey manager coupled to the response repository, the survey manager to dynamically designate a pool of target survey respondents to include a new target survey respondent from the community associated with the identified respondent.

19. A method for managing survey responses, the method comprising:
  receiving a plurality of survey responses from survey respondents;
  storing the plurality of survey responses in a response repository implemented on a hardware storage device;
  selecting a sample response of the plurality of survey responses, wherein the sample response corresponds to an identified respondent;
  identifying a community associated with the identified respondent, wherein the community comprises a social network;
  inferring a similar response from the community of the identified respondent based on the sample response of the identified respondent;
  assigning a first weighting factor to a first associated peer within the identified community of the identified respondent; and
  assigning a second weighting factor to a second associated peer within the identified community associated with the identified respondent, wherein the first associated peer is closer than the second associated peer to the identified respondent in degrees of separation, and wherein the first weighting factor is greater than the second weighting factor.

* * * * *